April 9, 1929.   F. H. BRAMWELL   1,708,387
HEAT TRANSFERRING APPARATUS
Filed July 23, 1926   2 Sheets-Sheet 2
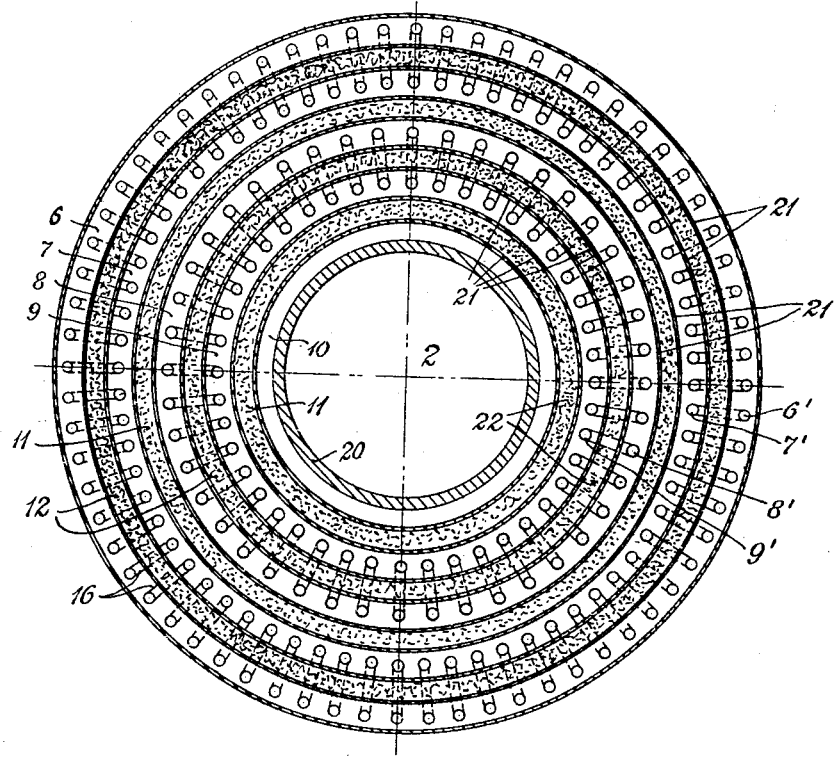
WITNESS
INVENTOR
FRANCIS H. BRAMWELL
BY
ATTORNEYS Patented Apr. 9, 1929.

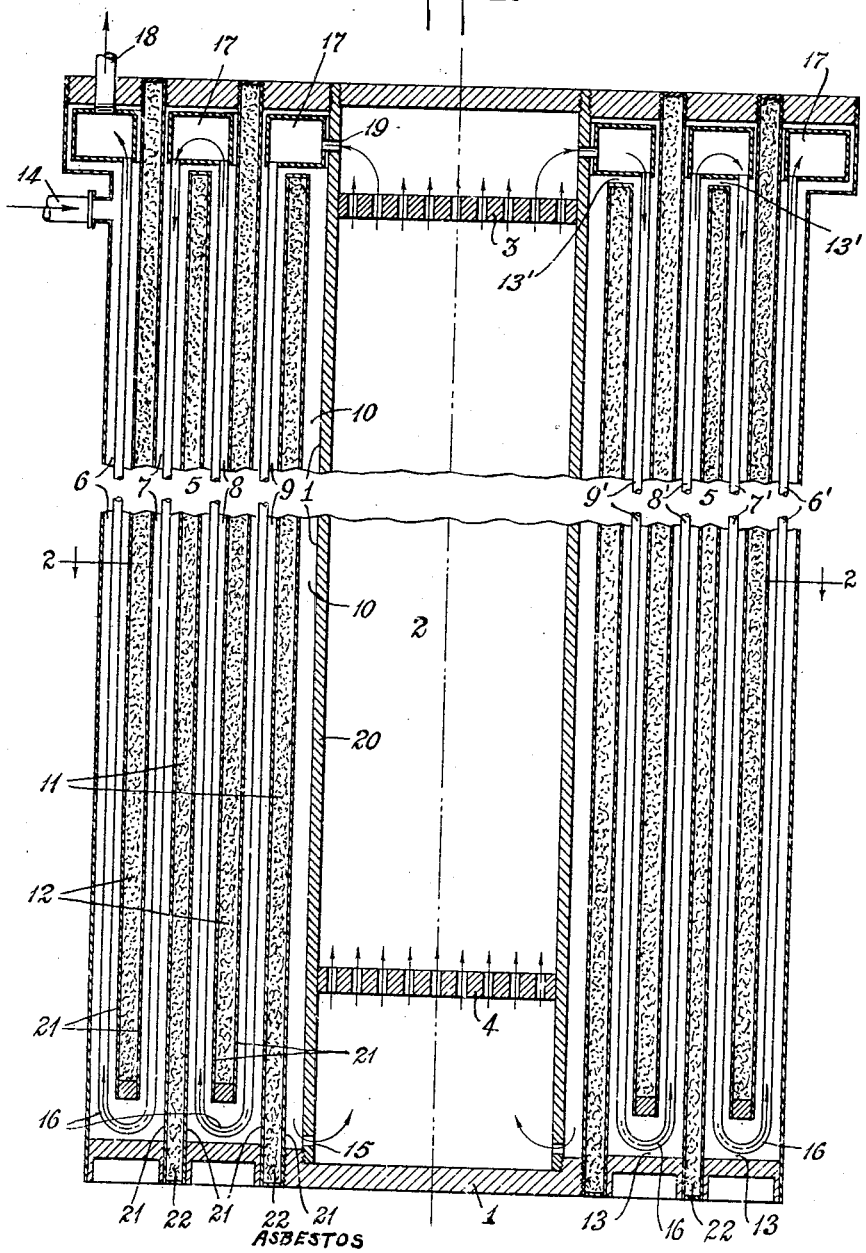

1,708,387

UNITED STATES PATENT OFFICE.

FRANCIS HERBERT BRAMWELL, OF DUNVEGAN, HARTFORD, ENGLAND, ASSIGNOR TO ATMOSPHERIC NITROGEN CORPORATION, OF SOLVAY, NEW YORK, A CORPORATION OF NEW YORK.

HEAT-TRANSFERRING APPARATUS.

Application filed July 23, 1926, Serial No. 124,538, and in Great Britain July 22, 1925.

This invention relates to means for transferring heat from one fluid to another, and more particularly to heat interchangers used in connection with gases under considerable pressure such as the compressed nitrogen-hydrogen gas mixture used for ammonia synthesis where the gas mixture, after being heated by heat exchange with the hot synthesized gas mixture, is to be contacted, still in the high pressure condition, with a body of catalyst.

For efficient heat transfer between two fluids in an apparatus, it is necessary that the fluids should travel in heat-exchange relation with each other over a relatively long path in relatively thin layers or streams, and at a high velocity. The first requirement for travel over a relatively long path apparently necessitates long or extended apparatus while the requirement of high velocity particularly in conjunction with a long path of travel tends to produce a substantial pressure drop or pressure differential between the inlet and exit points of the two fluid streams. When large volumes of gas under considerable pressure are handled, a substantial amount of power is consumed in maintaining the required circulation through the apparatus. This is particularly true where, as in the synthesis of ammonia, the gases are subjected to a treatment at an established high pressure (which may be in the hundreds of atmospheres) and are constantly recirculated, and where consequently a pressure drop requires the recirculating gases to be recompressed to the established pressure value.

The object of the present invention is to provide an apparatus which will give the required thin or divided fluid streams and length of travel and which will be compact and economical to manufacture.

A further object is to provide a heat interchanger through which the pressure drop or differential is reduced to a minimum.

A further object is to combine the improved interchanger unit with a unit for catalytic reactions, so that the two operations of heat interchange and catalysis can be conducted more efficiently and so that the outer wall of the apparatus may be protected from the relatively high temperature condition which prevails in the catalyst body.

The accompanying drawings illustrate one example of an embodiment of the invention. The drawings will be described with particular reference to the synthesis of ammonia from its elements at an elevated temperature and pressure. Fig. 1 is a sectional elevation of such apparatus and Fig. 2 is a horizontal section on the lines 2—2 of Fig. 1.

Referring to Fig. 1, the numeral 1 designates a converter unit enclosing the cylindrical catalyst compartment 2 formed by a cylinder 20 and perforated end plates 3, 4. A heat interchanger unit 5 surrounds the converter unit 1, it being of course understood that the whole apparatus fits into and is enclosed within a pressure resisting shell (not shown). The interchanger is divided into a plurality of concentric annular spaces 6, 7, 8, 9 and 10 by means of cylindrical baffle-like partitions 11 and 12, open or interrupted at one end, adjacent partitions being open at opposite ends as indicated at 13 and 13' respectively. These partitions or baffles are constructed of sheet iron walls 21 between which asbestos 22 is tightly packed. The outer and inner annular spaces are provided with gas openings 14 and 15. These spaces 6, 7, 8, 9 and 10 therefore constitute a continuous gas passage for gas entering the interchanger at 14 and leaving at 15 to enter the converter or vice versa.

A large number of relatively small tubes $6'$, $7'$, $8'$ and $9'$ traverse the compartments 6, 7, 8 and 9 longitudinally and are arranged symmetrically therein. Each set of parallel tubes is connected in series with the adjacent set or sets; for example, the ends of each pair of tubes $6'$—$7'$, $8'$—$9'$ etc. adjacent the open end 13 of the baffles are connected by U bends 16, and the opposite ends of each pair of tubes $7'$—$8'$ adjacent the open ends 13' of the baffles are connected by means of annular concentric headers 17 where the gas, separated into a large number of streams by the individual tubes, can mix before passing through the next set of tubes. The outer and inner headers are provided with gas openings 18 and 19 so that, as in the case of the annular spaces, the sets of tubes and connections constitute a continuous gas passage for gas entering at 19 from the converter and leaving at 18, or vice versa.

In the operation of my apparatus, nitrogen-hydrogen gas enters the circulatory system at 14, passes through the annular spaces 6, 7, 8, 9 and 10 in series and enters the converter unit, through the openings 15, and then passes into the catalyst space 2, through the perforations in the supporting plate 4. Simultaneously hot catalyzed gas passes from the converter unit into the tubes through openings 19, through the tubes of each set in parallel and through the sets of tubes in series and out of the circulatory system via opening 18. During its passage through the annular spaces, the nitrogen-hydrogen gas is progressively heated by heat exchange from the hot synthesized gas flowing counter current through the tubes, so that it reaches the catalyst in 2 at a temperature approximating that of the desired reaction temperature; and at the same time the hot synthesized gas flowing through the tubes progressively loses heat so that it finally leaves at 18 at a relatively low temperature. The preheated nitrogen-hydrogen gas entering the catalyst in 2 passes up through the catalyst where formation of ammonia takes place with evolution of heat and the highly heated and now synthesized gas passes out through 19 as above explained, thence through the heat exchanger tubes 9′, 8′, 7′, and 6′, and out at 18. From 18 the gases are conducted, as is customary in synthetic ammonia practice, through apparatus wherein ammonia is removed from the gases. The residual gases of this ammonia removal treatment are then either passed to additional converters or, as disclosed in U. S. Patent No. 1,202,995 of October 31, 1916, issued to Haber et al., are introduced to the stream of fresh gases of the same constitution which is on its way to the inlet 14 of the apparatus shown in the drawing.

It has been found that an efficiency of heat interchange of about 80%–90% may be attained with my apparatus and that the pressure drop through the apparatus is very small, so that a relatively small amount of work is necessary to raise the pressure of the exit gases once more to the synthesis pressure. This pressure drop depends in part on the number of tubes, decreasing with an increase in the number in an annular space. Of course, there is a practical limit to the number of tubes, but as many as 300 can be satisfactorily disposed in an annular space 3 feet in mean diameter.

It is evident that the improved apparatus provides length of travel and division of gas stream with great economy of space.

Another feature of the invention is that the converter unit is surrounded by the heat interchanger unit so as to preserve uniform temperature conditions in the catalyst mass (i. e., no variable or uncontrolled heat losses) and to protect the pressure-resisting wall of the apparatus (not shown in the drawings) from the high temperature conditions which prevail in the neighborhood of the catalyst.

It is preferred to pass the hot gases through the tubes and the cooler gases through the annular spaces, but the advantages of my invention are also obtained although not in full measure, with the reverse arrangement.

It will also be noted that the cross-sectional area of each annular space or of each set of tubes can be made the same or can be varied by suitable choice of the cross section of the spaces and of the number and size of the tubes.

It will be further observed that the use of headers in which the gases from each set of tubes commingle is not an essential feature of the invention. A single series of parallel continuous sinuous tubes extending up and down the annular spaces from the inner space outwards may be used. With this construction, of course, the number of tubes in successive annular spaces can not be varied, but will be the same throughout.

Various modifications may be made without departing from the nature of my invention as defined in the appended claims.

I claim:

1. A heat interchanger for a circulatory pressure system comprising a plurality of walls in telescoped relation to define compartments, connections joining said compartments so as to form a continuous tortuous gas passage, means constituting a second gas passage, said means comprising a multiplicity of tubes extending longitudinally of the apparatus and positioned within said first-mentioned tortuous gas passage, so as to be in intimate thermal relation therewith and gas inlet and outlet means for the aforesaid passages.

2. A heat interchanger for a circulatory pressure system comprising a plurality of walls in telescoped relation to define compartments, connections between said compartments, forming with said compartments a continuous tortuous gas passage, means constituting a second gas passage positioned within the first gas passage, so as to be in intimate thermal relation therewith, said means being composed of elements arranged to permit a length of flow of gas through said passage approximating the shortest gas path through the first mentioned gas passage counting from the beginning to the end of the establishment of the heat interchange relation between the two said gas passages and gas inlet and outlet means for the aforesaid passages.

3. A heat interchanger comprising a plurality of walls in telescoped relation to define concentric annular compartments, connections joining said compartments in series, so as to constitute a continuous tortuous fluid passage, a plurality of sets of relatively small cross section tubes longitudinally positioned in the annular compartments, the tubes in any one compartment being arranged to afford a parallel flow of fluid through the tubes in said compartment, the sets of tubes being connected in series from compartment to compartment so as to constitute, all together, a second continuous tortuous fluid passage and gas inlet and outlet means for said compartments and said second passage.

4. A heat interchanger comprising a plurality of walls in telescoped relation to define concentric annular compartments connections joining said compartments in series so as to constitute a continuous tortuous fluid passage, a plurality of circularly disposed sets of relatively small cross section tubes positioned longitudinally in the several annular compartments, the tubes in any one compartment being arranged to afford a parallel flow of fluid through the tubes in said compartment, the sets of tubes being connected in series from compartment to compartment, so as to constitute, all together, a second continuous tortuous fluid passage, a central catalyst chamber positioned within the aforesaid annular compartments, connections between one end of the catalyst chamber and the inner set of tubes and between the other end of the catalyst chamber and the inner annular compartment and gas inlet and outlet means for said compartments and said tubes.

5. A heat interchanger comprising a plurality of heat insulating walls in telescoped relation to define concentric annular compartments connections joining said compartments in series so as to constitute a continuous tortuous fluid passage, a plurality of sets of relatively small cross section tubes positioned longitudinally in the annular compartments, the tubes in any one compartment being arranged to afford a parallel flow of fluid through the tubes in said compartment, the sets of tubes being connected in series from compartment to compartment so as to constitute, all together, a second continuous tortuous fluid passage and gas inlet and outlet means for said compartments and said tubes.

6. A heat interchanger comprising a plurality of walls in telescoped relation to define concentric annular compartments connections joining said compartments in series so as to constitute a continuous tortuous fluid passage, a plurality of sets of U tubes positioned longitudinally in said compartments and disposed concentrically within the said interchanger, the arms of each of said tubes being located in adjacent compartments, annular headers connecting the sets of U tubes in series so as to constitute a second continuous fluid passage traversing the said annular compartments and gas inlet and outlet means for said tubes and said compartments.

7. A heat interchanger for a circulatory pressure system, comprising a plurality of thermal insulating cylindrical baffles defining annular spaces, connections between said spaces forming with said spaces a continuous tortuous gas passage, a multiplicity of small cross-sectioned tubes in each of said spaces, said tubes extending parallel to the axis of the apparatus and individually arranged to provide but a single pass through each of the annular spaces, the tubes in each annular space communicating with tubes of an adjacent annular space through connections extending transverse of the cylindrical baffles so that the gas flows in parallel through all the tubes in each space.

8. A heat interchanger for a circulatory system, comprising a successive series of annularly arranged nests of U-shaped tubes, annular headers connecting the adjacent legs of the U-shaped tubes of successive nests, thermal insulating cylindrical baffles positioned in the annular spaces within the U's of successive nests and between the header-connected legs of adjacent nests, said baffles being alternately open at their opposite ends, whereby annular connected spaces are formed between successive baffles.

In testimony whereof I have hereunto set my hand.

FRANCIS H. BRAMWELL.